(12) United States Patent
Pedros et al.

(10) Patent No.: US 8,398,855 B1
(45) Date of Patent: Mar. 19, 2013

(54) BIOCAST PROCESS

(76) Inventors: Philip Bruno Pedros, Wakefield, MA (US); Mark Mathew Simon, Wilbraham, MA (US); Stephen Howard Brown, Spencer, MA (US)

(*) Notice: Subject to any disclaimer, the term of this patent is extended or adjusted under 35 U.S.C. 154(b) by 310 days.

(21) Appl. No.: 12/924,614

(22) Filed: Sep. 30, 2010

Related U.S. Application Data

(60) Provisional application No. 61/277,844, filed on Sep. 30, 2009.

(51) Int. Cl.
*C02F 3/30* (2006.01)
(52) U.S. Cl. ........ 210/603; 210/605; 210/630; 210/631; 210/259; 210/903
(58) Field of Classification Search .................. 210/603, 210/605, 630, 631, 252, 259, 903
See application file for complete search history.

(56) References Cited

U.S. PATENT DOCUMENTS

| | | | |
|---|---|---|---|
| 4,211,646 A | 7/1980 | Westbrook et al. | |
| 4,290,895 A * | 9/1981 | Iwamoto | ...................... 210/669 |
| 4,522,727 A | 6/1985 | Weber | |
| 4,770,748 A | 9/1988 | Cellini et al. | |
| 4,880,504 A | 11/1989 | Cellini et al. | |
| 5,304,365 A | 4/1994 | Taborsky | |
| 5,462,666 A | 10/1995 | Kimmel | |
| 5,512,182 A | 4/1996 | Sheikh | |
| 5,670,046 A | 9/1997 | Kimmel | |
| 6,077,494 A | 6/2000 | Gasiorowski et al. | |
| 6,391,207 B1 | 5/2002 | Cluyse | |
| 6,716,351 B2 | 4/2004 | Fassbender | |
| 6,838,069 B2 | 1/2005 | Blonigen et al. | |
| 6,881,339 B1 | 4/2005 | Hogl et al. | |
| 6,893,566 B2 | 5/2005 | Fassbender | |
| 6,905,602 B1 | 6/2005 | Dobie et al. | |
| 6,998,048 B1 | 2/2006 | Dobie et al. | |
| 7,033,562 B2 | 4/2006 | Knasiak | |
| 7,135,116 B2 | 11/2006 | Haggerty | |
| 7,153,429 B1 | 12/2006 | Pedros | |
| 7,270,796 B2 | 9/2007 | Kemp et al. | |
| 7,438,813 B1 | 10/2008 | Pedros et al. | |
| 2002/0159942 A1 | 10/2002 | Jessup et al. | |
| 2004/0025715 A1 | 2/2004 | Bonde et al. | |
| 2005/0139546 A1 * | 6/2005 | Burke | ........................... 210/603 |
| 2007/0102352 A1 * | 5/2007 | Burke | ........................... 210/603 |
| 2007/0297953 A1 | 12/2007 | Kemp et al. | |
| 2008/0053909 A1 | 3/2008 | Fasbender | |
| 2008/0156726 A1 | 7/2008 | Fassbender | |

* cited by examiner

*Primary Examiner* — Fred Prince
(74) *Attorney, Agent, or Firm* — John P. McGonagle

(57) ABSTRACT

A waste treatment process comprised of an ammonification system to convert soluble organic nitrogen into ammonia nitrogen, followed by a physico-chemical process to remove a substantial amount of the ammonia as a recovered ammonium sulfate fertilizer or ammonium hydroxide ("aqua ammonia"), and followed by an ammonia oxidation process to oxidize the remaining ammonia from the physico-chemical process. The process reduces ammonia and carbonaceous organic matter to less than 10 mg/l and recovers ammonia in the form of either ammonium sulfate or ammonium hydroxide.

3 Claims, 5 Drawing Sheets

BIOCAST PROCESS

CROSS-REFERENCE TO RELATED APPLICATIONS

Applicants claim the priority benefits of U.S. Provisional Patent Application No. 61/277,844, filed Sep. 30, 2009.

BACKGROUND OF THE INVENTION

This invention relates to waste treatment systems, and in particular, to a method for removing nitrogen and recovering ammonia content from waste streams with high concentrations of nitrogen, a portion of which is organically bound nitrogen, such as in the supernatant of anaerobically digested sludge, landfill leachate or industrial wastewaters. The method is comprised of a biological process (aerobic or anaerobic), followed by a physico-chemical process and, in some cases, followed by an aerobic biological process.

An example of an application for the present invention process with an aerobic first step is for municipal wastewater treatment plants with anaerobic digestion. The supernatant from the anaerobic digestion of blended or secondary sludge contains high concentrations of ammonium that, as a recycle stream to the influent of a wastewater treatment plant, may account for as much as 17-20% of the nitrogen loading to the plant. This waste stream together with other nitrogen rich recycles may contribute 20-30% of total nitrogen load to the plant. These recycle streams introduce additional difficulty to treatment, within the main plant, because (1) they typically do not contain the requisite carbon to nitrogen ratio (C/N) for traditional biological nitrogen removal; and (2) they are generated by sludge handling operations that typically do not occur every day and, therefore, result in shock loads to the main plant. However, the increasingly stringent nutrient limits being applied to wastewater treatment plants require management of these recycle streams in order to consistently achieve low effluent nitrogen concentrations.

SUMMARY OF THE INVENTION

The present invention process combines several core technologies to substantially reduce ammonia to less than 10 mg/l or lower. The invention process combines both biological and physico-chemical processes together in order to achieve energy conservation and resource recovery simultaneously. The invention process is hereinafter referred to as the Bio-CAST process. The invention process is designed to increase ammonia recovery, to reduce electrical energy requirements, to reduce chemical consumption, to reduce space requirements when compared to biological processes alone, and to be economically feasible while achieving very low total nitrogen concentrations in the recycle stream.

The core technologies for the BioCAST process are (1) an ammonification system to convert soluble organic nitrogen into ammonia nitrogen, (2) a physico-chemical process to remove a substantial amount of the ammonia as a recovered ammonium sulfate fertilizer or ammonium hydroxide ("aqua ammonia"), and (3) an ammonia oxidation process to oxidize the remaining ammonia from the physico-chemical process. The combined technologies in the invention process reduce ammonia and carbonaceous organic matter to less than 10 mg/l and recovers ammonia in the form of either ammonium sulfate or ammonium hydroxide. The BioCAST process first maximizes ammonia in the wastewater and then recovers the ammonia in the form of commercial-grade ammonium sulfate or other ammonium salt.

The ammonification system is a biological process designed to convert soluble organic nitrogen into ammonia nitrogen. Ammonification is the release of ammonia nitrogen which occurs as amino acids and other nitrogen containing carbonaceous compounds undergo biodegradation either aerobically or anaerobically. In the aerobic process ammonification occurs as heterotrophic bacteria oxidize nitrogen containing soluble organic matter. In the anaerobic process multiple pathways including hydrolysis, fermation and acidogenesis, result in the degradation of the compounds containing organically bound nitrogen. The choice of whether to use the BioCAST process with an aerobic or an anaerobic first stage is dependent on the type of wastewater to be treated. For example, with waste streams with high BOD content, an anaerobic first stage may be the most effective.

In this first stage of the invention, i.e., the ammonification reactor, the purpose is to reduce the carbonaceous matter, some of which contains nitrogen which when released is converted to ammonia. The result will be an increase in ammonia nitrogen prior to entering the physico-chemical process.

The physico-chemical process removes ninety percent of the nitrogen as a recovered ammonium sulfate, ammonium nitrate, or ammonium phosphate that can be used as a fertilizer. Alternatively the ammonia can be recovered as an ammonium chloride, or other ammonium salt, and sold as a commodity product. One additional desirable product is aqua ammonia (Ammonium Hydroxide). The ammonia gas can be introduced directly into demineralized water to produce ammonium hydroxide, i.e., aqua ammonia.

The physico-chemical process is based upon a vacuum separation process, sold by CASTion Corporation, of Worcester, Mass., as the R-CAST process. Various aspects of the R-CAST process are described in U.S. Pat. Nos. 4,770,748 and 4,880,504, incorporated herein by reference. The R-CAST process performs two major functions. Its primary function is to remove approximately 90% of the ammonia from the influent centrate. A secondary function is to strip ammonia from ammonification/AOx backwash wastewater. An R-CAST unit can be operated individually, in series, or in parallel for high flow streams or to treat high concentration ammonia streams. The R-CAST unit for recovery of the ammonia from the ammonification unit normally operates in a batch mode set by the respective backwash frequencies.

The effluent containing ammonia from the ammonification process is directed as influent to the R-CAST unit, comprised of a vacuum assisted flash stripping tower, where the ammonia is removed from the effluent. During operation, ammonium is converted to ammonia gas by raising the pH of the wastewater to approximately 11. The ammonia gas is drawn out of the stream into a vapor stream. The vapor leaves the R-CAST in a separate vapor tube where it is condensed and introduced to a water stream containing acid. The removed ammonia gas is placed in contact with water or water containing an acid such as sulfuric, nitric, hydrochloric, phosphoric, and/or another acid. In the case of sulfuric acid, there is a reaction creating ammonium sulfate, a salable product that can be used in the fertilizer industry or other areas as raw material. Tests have shown that the purity of ammonium sulfate is high due to the minimal passage of volatile organic compounds which are primarily removed in the upstream biological process.

The ammonia oxidation process is a biological process based on an ammonia oxidation reactor sold under the trademark AOx by F.R. Mahony & Associates, Inc., Rockland, Mass. The effluent from the R-CAST unit contains 100-200 mg/l of ammonia. Acid is introduced to lower the pH of the R-CAST effluent and convert the ammonia back to ammonium. The AOx reactor is designed to achieve ammonia oxidation to nitrite and subsequent denitrification with a supplemental electron donor. Within the AOx reactor the first step of nitrification (ammonia oxidation to nitrite) occurs as described by the following mass-based equation normalized to ammonium.

$$NH_4^+ + 2.457O_2 + 6.716HCO_3^- \Longrightarrow 0.114C_5H_7O_2N + 2.509NO_2^- + 1.036H_2O + 6.513H_2CO_3.$$

Several environmental conditions conducive to partial nitrification (i.e. oxidation of ammonia to nitrite), exist within the AOx reactor. First, it has been shown that the relative ratios of $C_{DO}/C_{NH4-N}$ and $C_{DO}/C_{FA}$ are indicative of the nitrogen species (i.e. nitrite or nitrate) predominating in the effluent, where:

$C_{DO}$—concentration of dissolved oxygen (mg/l)
$C_{NH4-N}$—concentration of total ammonia mg ($NH_3$—N/1)
$C_{FA}$—concentration of free ammonia (mg $NH_3$—N/1)

In order to have nitrite as the predominating species produced from the biological transformation of ammonia, a $C_{DO}/C_{NH4-N}$ ratio of less than one (1) and a $C_{DO}/C_{FA}$ ratio of less than ten (10) is maintained within the reactor. Therefore one of the control mechanisms for partial nitrification is to limit the dissolved oxygen (DO) concentration. Controlling the concentration of dissolved oxygen ($C_{DO}$) is achieved by intermittently aerating the bioreactor. Secondly, in a high ammonia concentration waste stream with a slightly elevated pH (such as the effluent from the R-CAST unit), there is a high concentration of free ammonia which inhibits the conversion of nitrite to nitrate (i.e. stops the reaction as described above). Finally, the temperature of the effluent from the R-CAST step is approximately 40° C. or higher and will be cooled to approximately 35° C. At this temperature the growth rate of ammonia oxidizing bacteria (AOB) is approximately twice that of the nitrite oxidizing bacteria (NOB). Therefore with adequate removal of sludge (i.e. backwashing of the reactor) the NOB will be constantly removed from the system.

Microbiological studies of the biofilm indicate that operating the reactor with intermittent aeration coupled with the free ammonia toxicity inherent in the waste stream tend to exclude nitrite oxidizing bacteria (NOB) from the biofilm, not just suppress them. The result is stable partial nitrification (i.e. ammonia oxidation only).

In order to remove the nitrogen, denitrification will also be achieved within the AOx reactor. Since the intermittent aeration provides anoxic conditions within the bioreactor addition of a supplemental electron donor (carbon source likely) would result in denitrification of nitrite as described by the following simplified reaction:

$$6NO_2^- + 3CH_3OH \Longrightarrow 3N_2 + 6HCO_3^- + 3H_2O$$

The BioCAST process fits into an overall plant process flow and offers several advantages for the management of high strength nitrogen waste streams. The BioCAST process maximizes the amount of ammonia that may be recovered by flash distillation. The BioCAST process also achieves very low total nitrogen numbers, but with significantly reduced oxygen and chemical requirements. There are three reasons for this. Firstly, only a small fraction of the total nitrogen in the waste stream is treated biologically. Secondly, the biological portion of the process requires 25% less oxygen and 40% less supplemental carbon than conventional biological nitrogen removal. Thirdly, the BioCAST process requires approximately five (5) times less reactor area to treat a given waste stream than conventional biological treatment.

These together with other objects of the invention, along with various features of novelty, which characterize the invention, are pointed out with particularity in the claims annexed hereto and forming a part of the disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF INVENTION

Figure 1:
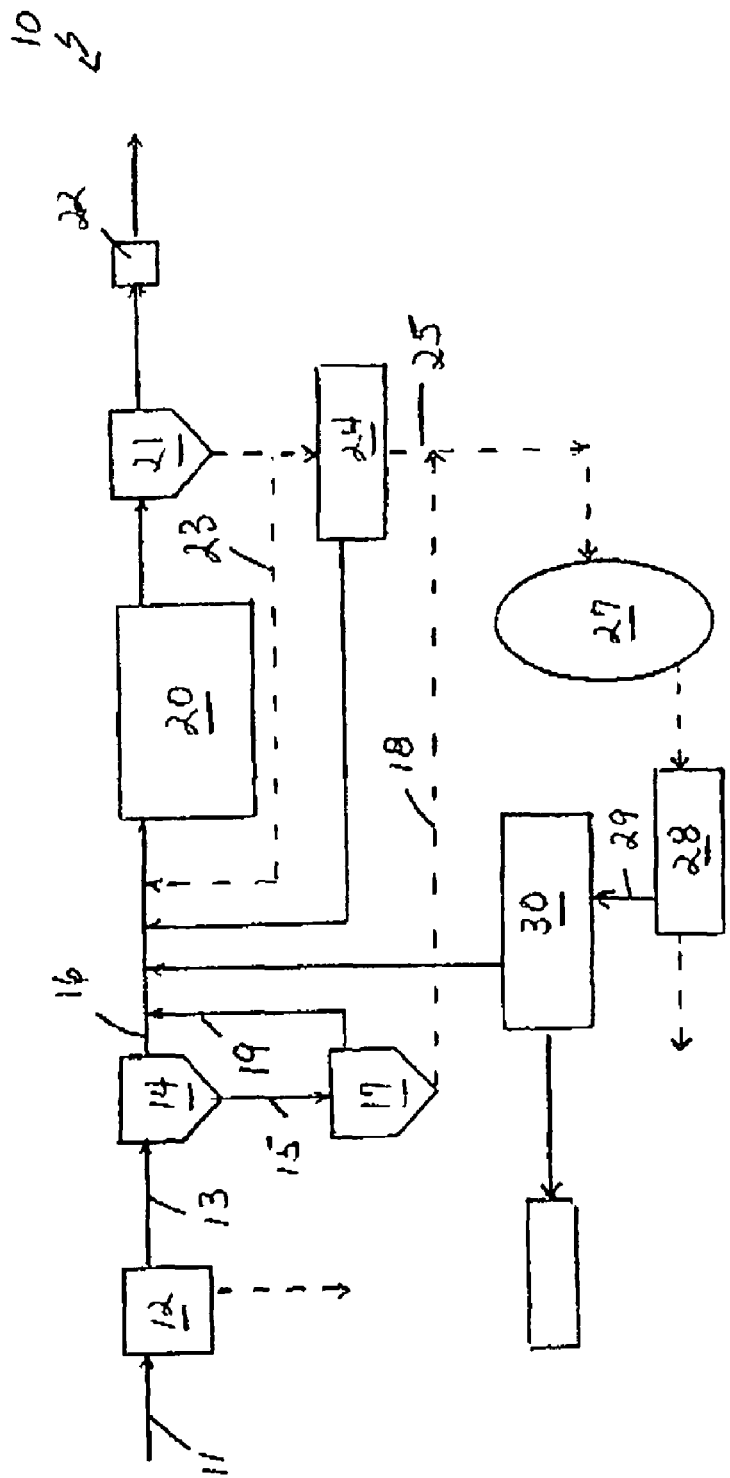
FIG. 1 is a typical wastewater treatment plant process schematic with the invention process.

Referring to the drawings in detail wherein like elements are indicated by like numerals, there is shown a process flow for a typical wastewater treatment plant 10, and the BioCAST process 30 installed in the wastewater treatment plant 10. The BioCAST process has three major components, i.e., ammonification reactor 40, R-CAST vacuum separation unit 70, and an AOx reactor 90.

Referring more particularly to FIG. 1, a typical wastewater treatment plant 10 will have a raw influent 11 passed to the plant 10 through an influent pipe. Solids within the raw influent will be filtered out through a screening assembly 12 and passed out for disposal. The screened raw influent 13 is then passed to a primary clarifier 14 where solids still within the screened raw influent will separate into a sludge component 15 and a liquid component 16. The sludge component 15 is passed to a thickener 17 with the waste sludge 18 then passed to an anaerobic digester 27. The clarifier liquid component 16 and a thickener liquid component 19 are then brought into the treatment plant's main biological process 20. The biological process output is then passed to a secondary clarifier 21 for further settling out and separation of liquid from solids. The liquid from the secondary clarifier 21 is then passed out for a tertiary processing 22. A portion of a sludge component 23 from the secondary clarifier 21 is recycled into the biological process 20 as return sludge while the remaining sludge is passed to a first centrifuge 24 for further separation of liquid from solids. The centrifuge solids 25, i.e., wasted sludge, and thickened wasted sludge 18 are passed to the anaerobic digester 27 for further processing. The first centrifuge liquid component 26, i.e., first centrate, is formed into a recycle stream and brought back into the biological process 20. The digester 27 digests the wasted sludge 25 and outputs the digested sludge to a second centrifuge 28. Solids from the second centrifuge 28 are separated out for disposal. The second centrifuge liquid component 29, i.e., second centrate, is a high strength supernatant and provides the influent for the BioCAST process. The second centrate has a high ammonium concentration. Due to the high ammonium concentration in the second centrate, a typical wastewater treatment plant may see 10-20% of the nitrogen from the second centrate entering the plant.

Traditionally, the biological reactor 20 processes the influent stream, including the recycle stream, and oxidizes the ammonia content of the stream converting the ammonia, in a two-step process, into nitrite and then to nitrate. The nitrate is then passed through a denitrification process whereby the nitrate is converted to nitrogen gas and released into the atmosphere. The process of oxidizing ammonia to nitrate requires substantial quantities of oxygen from external air blowers. If denitrification is required as well, substantial quantities of chemicals to provide the carbon source may be required. Supplying air to the biological reactor is one of the biggest cost factors in operating a wastewater treatment plant.

In the present invention, the BioCAST process treats the second centrate so that the ammonia content in the second centrate is substantially removed. The BioCAST ammonification and vacuum separation operations convert ammonia to an end product of about 40% ammonium sulfate for sale as fertilizer, or to ammonium hydroxide, i.e., aqua ammonia, and second biological process further reduce nitrogen, carbonaceous matter and TSS (total suspended solids). Any remaining nitrogen, carbonaceous matter or TSS may be (1) returned to the treatment plant's main stream, (2) used as process water prior to return to the main stream, or (3) returned to the main stream effluent prior to disinfection.

Figure 2:
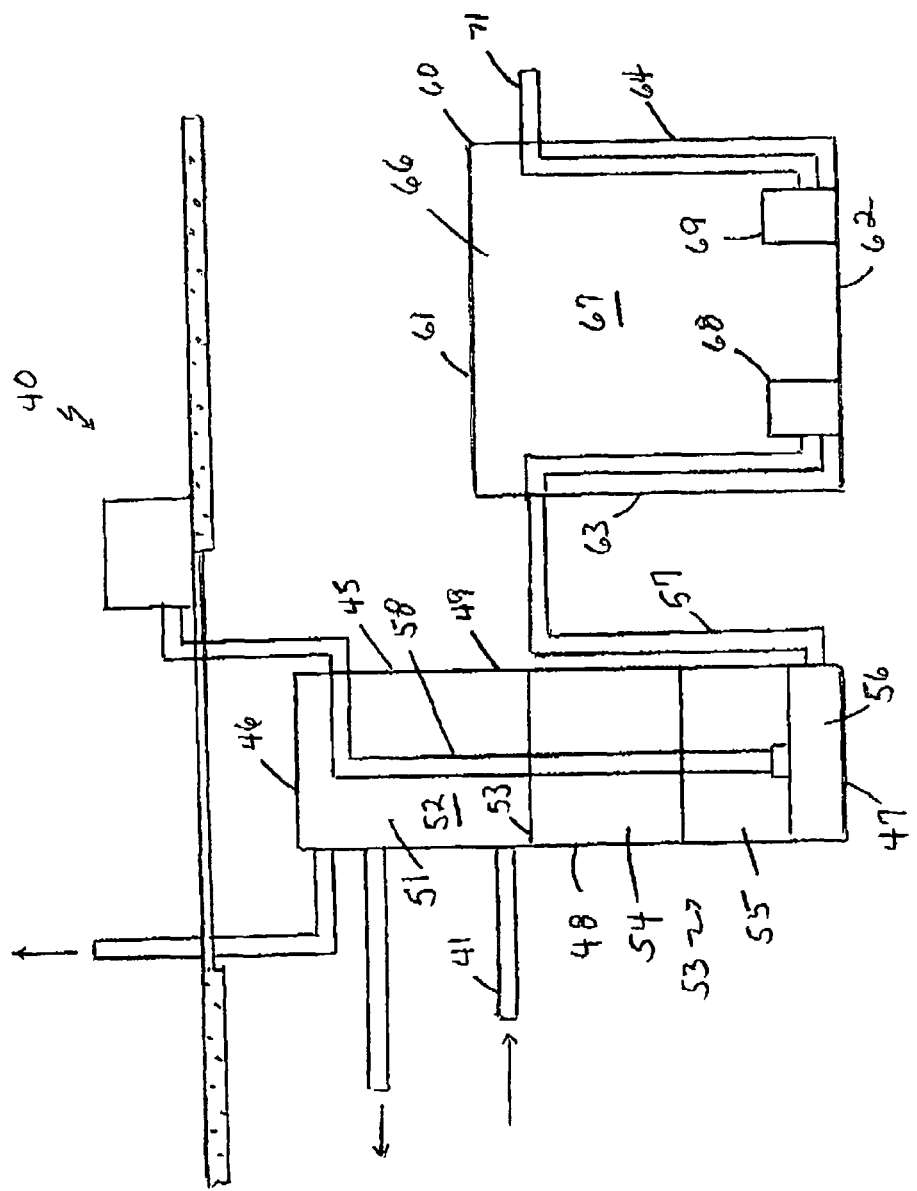
FIG. 2 is a schematic of an aerobic ammonification processor.
Figure 3:
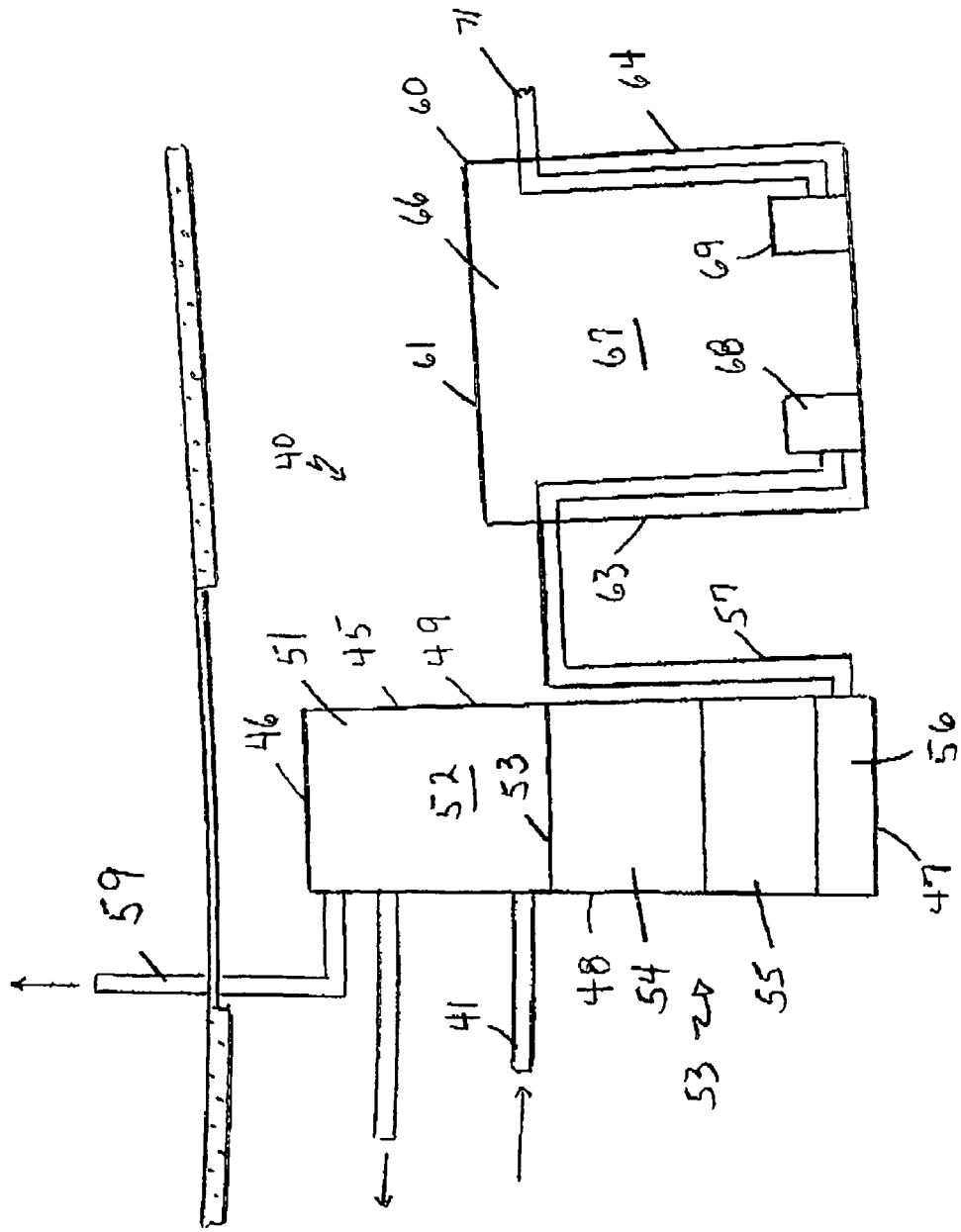
FIG. 3 is a schematic of an anaerobic ammonification processor
Figure 4:
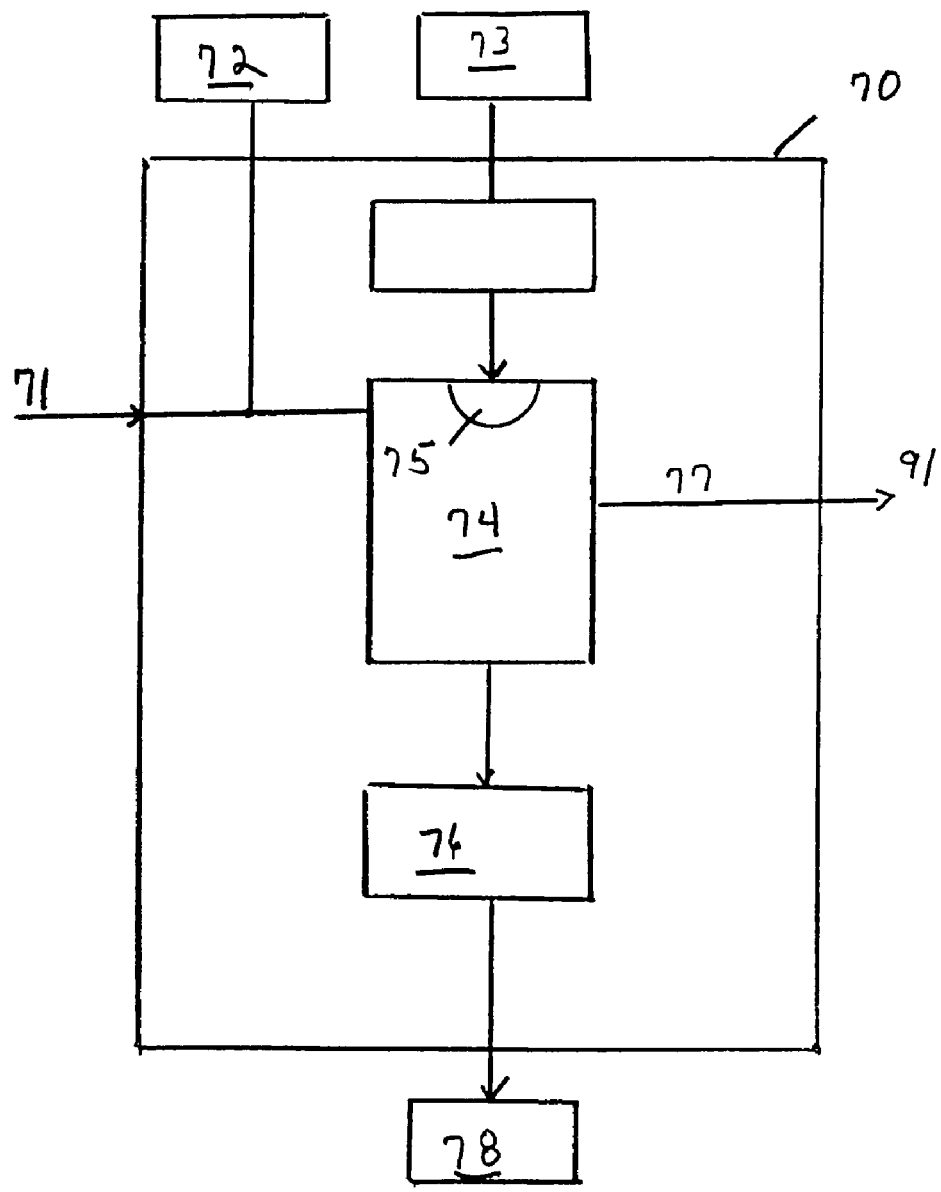
FIG. 4 is a block diagram of an R-CAST unit.

Referring to FIG. 2 there is shown an aerobic ammonification processor 40. FIG. 3 shows an anaerobic processor 40. The difference between the two types is the aerobic air pipe 58 bringing air from an external source and diffusing the air in the filter 53. The aenerobic processor also has means 59 for venting methane gas. The ammonification processor 40 is comprised of a biological reactor 45 and a clear well 60. Nitrogen in the second centrate 29 providing an influent 41 to the BioCAST system is comprised of ammonia and organically bound nitrogen. The biological reactor 45 has a top 46, bottom 47, receiving side 48, discharge side 49, front side (not shown) and rear side 51, said top, bottom, and sides defining a biological reactor interior 52. The reactor interior 52 has a filter 53 made up of at least two layers, an upper sand layer 54 and an adjacent lower gravel layer 55. A sump 56 is formed beneath the filer 53 adjacent the interior bottom 47. The reactor interior 52 receives the influent 41 protruding through the reactor receiving side 48. The influent pipe 41 opens into the reactor interior 52 just above the reactor filter 53. The influent is an anoxic waste stream and flows through the filter layers and collects in the reactor sump 56. In an aerobic system biochemical transformation of the organic material in the waste stream by bacteria attached to the filter 53 oxidizes the organic carbonaceous matter causing the release of organically bound nitrogen. This nitrogen, typically in the form of amines (mR2-), is immediately converted to nitrogen. The resulting effluent in the sump 56 therefore has a higher percentage of ammonia nitrogen than the influent. The resulting effluent is brought out through the reactor discharge side 49 via a discharge pipe 57 into the clear well 60. The clear well 60 has a top 61, bottom 62, receiving side 63, discharge side 64, front side (not shown) and rear side 66, said top, bottom and sides defining a clear well interior 67. A first clear well pump 68 within the clear well interior 67 draws the biological reactor effluent, rich in ammonia nitrogen, into the clear well interior 67. A second clear well pump 69 discharges effluent from the clear well interior 67 into the invention R-CAST unit influent pipe 71. Backwash water from the ammonification reactor is sent to a solids separation tank and the supernatant is pumped and mixed with the influent.

The R-CAST unit 70 strips ammonia from the influent 71 utilizing a pH shift, control of partial pressures and temperature. The ammonia may be further processed for commercial products or stored 78 for later use. Alkali 72 is added to the influent 71 to convert ammonium to ammonia gas. Water 73 is introduced to the reaction chamber 74 through a spray nozzle (Flashed) 75 to yield a high degree of exposed surface for the ammonia gas to leave the aqueous phase and be transported to a venturi 76 or the vacuum pump.

The R-CAST reaction vessel is under vacuum at approximately −28 inches of mercury or lower so that the partial pressure of ammonia at the surface of the liquid droplets is far lower than its equilibrium pressure. A temperature above ambient is needed to raise the equilibrium pressure driving force and achieve a high rate of ammonia removal. The second centrate 29 is normally produced at 90 to 100° F., which is often adequate for efficient ammonia removal. Higher temperatures up to 140° F. improve process efficiency.

There are three critical elements in the R-CAST operation, namely, high flow rate recirculation pump, a baffle system to prevent entrainment, and a venturi or vacuum pump to create the vacuum and capture the ammonia from an R-CAST vapor tube. The recirculation pump circulates the distillation bottoms from the R-CAST back to the spray nozzle in the mid section of the reactor vessel. The liquid is maintained at a minimum level in the reactor vessel with an extended suction stand pipe to provide sufficient net positive suction pressure for the R-CAST recirculation pump. A baffle arrangement is staged near the top of the reaction vessel. The baffles are designed to minimize containment carry over to the vapor tube. The ammonia vapors are drawn into the suction side of the vacuum pump or venturi. Sulfuric acid water or other acids are used to create the liquid seal on the vacuum pump and reacts with the ammonia to create an ammonium sulfate by-product, aqua ammonia or other ammonia salts. Sulfuric acid can also be fed under pressure to provide the motive force for a venturi. The suction side of the venturi then draws in the ammonia vapors and a small fraction of the second centrate fluid. The ammonia concentration at this point in the system is approximately 100 ppm $NH_3$—N.

The ammonia separation process in the R-CAST is employed to treat the ammonia rich centrate and any spent backwash wastewater from the ammonification unit and the AOx unit. While the centrate is treated in a semi-continuous process, the spent backwash wastewater is introduced to the R-CAST process on an episodic basis or bled into the feed to the BioCAST process. In either case, gaseous ammonia from the R-CAST vessel is drawn down the vapor tube to the suction side of the vacuum pump. A sulfuric acid feed system is used for the liquid seal in the vacuum pump, creating the ammonium sulfate product as previously described.

The sulfuric acid/ammonium sulfate solution circulates back to a product storage tank(s). The produced ammonium sulfate can be sold as a 21:24 S and N commodity to the open market. Once the desired concentration of ammonium sulfate is reached, the ammonium sulfate tank and its contents are transferred to a receiving truck for recovery.

Recycle streams such as the centrate from anaerobically digested sludge typically contain sufficient amounts of ammonia, phosphate and magnesium to form struvite, magnesium ammonium phosphate ($MgNH_4PO_4.6H_2O$), a common form of struvite. The solubility of struvite decreases with pH and therefore, forms in the R-CAST during the addition of caustic. The struvite precipitate is subsequently removed in the AOx reactor and then removed from the AOx reactor during backwash. This step will result in the removal of phosphate from the centrate. This is a desirable yet unintentional consequence of the process.

The remaining effluent 77 from the R-CAST process is directed to the AOx reactor 90. The ammonia concentration at this point in the BioCAST system is approximately 100 ppm $NH_3$—N. The AOx reactor then removes ammonia down to less than 10 ppm $NH_3$—N as well as any residual organic carbonaceous matter and suspended solids.

Figure 5:
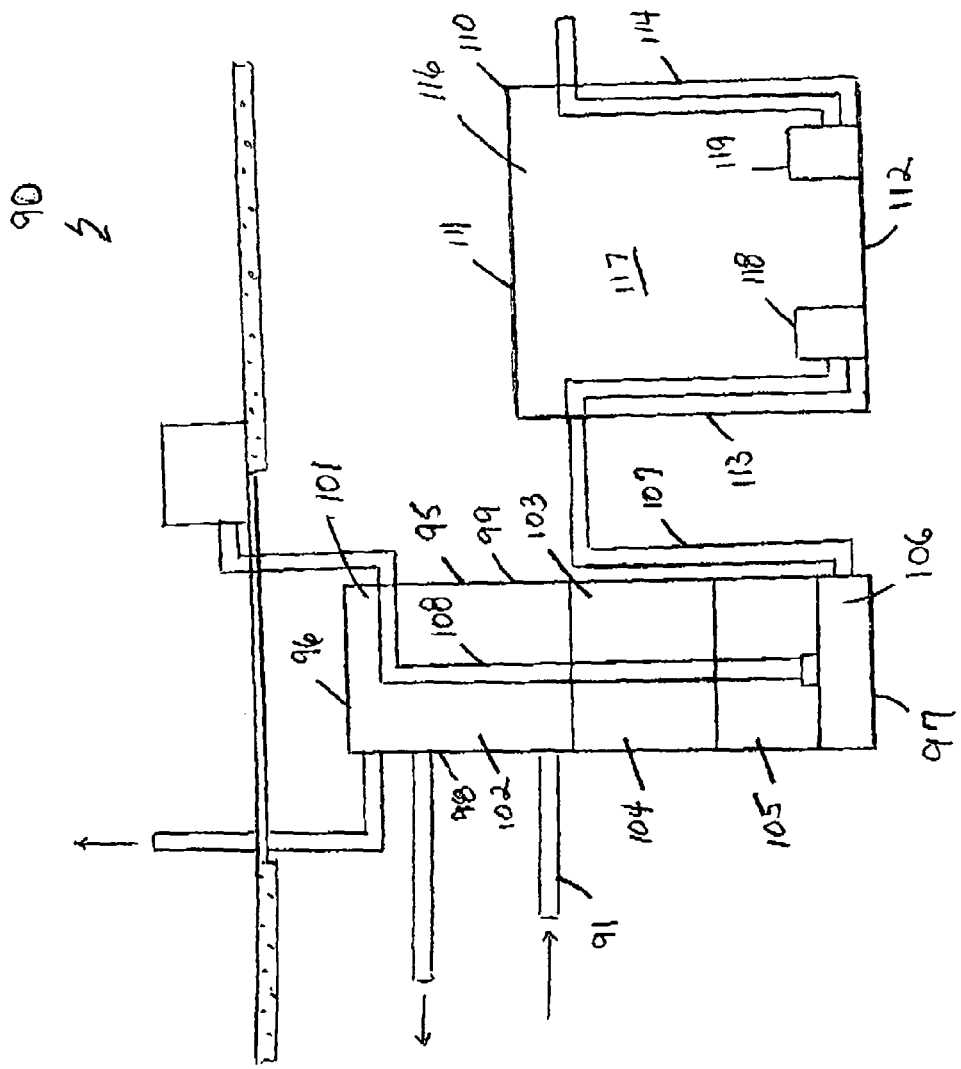
FIG. 5 is a schematic of an AOx processor.

Referring to FIG. 5 there is shown an AOx reactor 90. The AOx process 90 is comprised of a biological reactor 95 (AOx reactor) and a clear well 110. The remaining R-CAST effluent 77 provides an influent 91 to the AOx process. The biological (AOx) reactor 95 has a top 96, bottom 97, receiving side 98, discharge side 99, front side 100 and rear side 101, said top, bottom, and sides defining a biological reactor interior 102. The reactor interior 102 has a filter 103 made up of at least two layers, an upper sand layer 104 and an adjacent lower gravel layer 105. A sump 106 is formed beneath the filer 103 adjacent the interior bottom 97. The reactor interior 102 receives the influent 91 via a pipe protruding through the reactor receiving side 98. The influent pipe 91 opens into the reactor interior 102 just above the reactor filter 103. The influent flows through the filter layers and collects in the reactor sump 106. Oxidation of the ammonia nitrogen is carried out by chemolithoautotrophic bacteria under aerobic conditions. Reduction of nitrite to nitrogen gas is mediated by heterotrophic bacteria under anoxic conditions. These two different populations of bacteria are present in the filter 103 due to the intermittent aeration of the biological reactor 95. The effluent within the filter is simultaneously treated aerobically by an air pipe 108 causing bacteria to oxidize ammonia nitrogen to nitrite nitrogen, a process known as nitritation. The low dissolved oxygen in the reactor coupled with low concentrations of free ammonia toxicity tends to exclude nitrite oxidizing bacteria (NOB) from the biofilm, not just suppress them. The result is stable partial nitrification (i.e. ammonia oxidation only).

The resulting effluent in the sump 106 has a low concentration of total nitrogen. The resulting effluent is brought out through the reactor discharge side 99 via a discharge pipe 107 into the clear well ii0. The clear well 110 has a top 111, bottom 112, receiving side 113, discharge side 114, front side (not shown) and rear side 116, said top, bottom and sides defining a clear well interior 117. A first clear well pump 118 within the clear well interior 117 draws the AOx biological reactor effluent, into the clear well interior 117. A second clear well pump 119 discharges effluent from the clear well interior 117 into the main plant biological process 20.

It is understood that the above-described embodiment is merely illustrative of the application. Other embodiments may be readily devised by those skilled in the art which will embody the principles of the invention and fall within the spirit and scope thereof.

We claim:

1. In a wastewater treatment system having at least an influent pipe passing raw influent into a first solid separator having a raw influent liquid output portion feeding into a system biological processor having an output portion being passed into an anaerobic sludge digester having a digested output being passed to a second solid separator, a process for removing ammonia content from waste streams with a high ammonium-nitrogen concentration, comprising the steps of:

providing an ammonification biological reactor to convert soluble organic nitrogen into ammonia nitrogen, said biological reactor receiving an influent having an ammonia content and an organically bound nitrogen content, oxidizing said organically bound nitrogen content, releasing nitrogen, converting said nitrogen to ammonia nitrogen, and producing a biological reactor effluent;

providing a physico-chemical processor to remove ammonia from the biological reactor effluent, said processor receiving the biological reactor effluent as a processor influent, wherein an alkali is added to the processor influent to convert ammonium to ammonia gas, wherein a portion of the ammonia gas is removed from the processor influent by means of a vacuum assisted flash stripping tower, wherein the removed ammonia gas is moved into a venturi, wherein said removed ammonia gas is collected from said venturi and stored, wherein a remaining portion of said processor influent is provided to a processor effluent output;

providing an ammonia oxidation reactor to oxidize remaining ammonia from the physico-chemical process, said oxidation reactor receiving the processor effluent output as an oxidation reactor influent, said oxidation reactor having an interior with a sand and gravel filter and an air pipe adapted to receive and diffuse air from an external source into the filter, said oxidation reactor influent passing through said filter wherein an ammonia nitrogen portion of said oxidation reactor influent is oxidized by bacteria within said filter producing an oxidation reactor effluent.

2. A process as recited in claim 1, wherein:
said ammonification biological reactor is an aerobic reactor having an interior with a sand and gravel filter and an air pipe adapted to receive and diffuse air from an external source into the filter, said influent passing through said filter.

3. A process as recited in claim 1, wherein:
said ammonification biological reactor is an anaerobic reactor having an interior with a sand and gravel filter, said influent passing through said filter.

* * * * *